United States Patent
Williams Vigliaturo

(10) Patent No.: US 6,307,998 B2
(45) Date of Patent: Oct. 23, 2001

(54) FIBER OPTIC MODULE INCLUDING LENS CAP

(75) Inventor: Shari Lynn Williams Vigliaturo, Excelsior, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/756,441

(22) Filed: Jan. 8, 2001

Related U.S. Application Data

(62) Division of application No. 09/121,066, filed on Jul. 21, 1998, now Pat. No. 6,208,796.

(51) Int. Cl.$^7$ ................................................... G02B 6/36
(52) U.S. Cl. ............................ 385/134; 385/78; 385/81; 359/511
(58) Field of Search .................................. 385/134–136, 385/78, 81; 359/511

(56) References Cited

U.S. PATENT DOCUMENTS

| | | |
|---|---|---|
| Re. 34,955 | 5/1995 | Anton et al. . |
| 4,732,450 | 3/1988 | Lee . |
| 4,782,430 | 11/1988 | Robbins et al. . |
| 5,214,735 | 5/1993 | Henneberger et al. . |
| 5,303,125 | 4/1994 | Miller . |
| 5,363,465 | 11/1994 | Korkowski et al. . |
| 5,432,875 | 7/1995 | Korkowski et al. . |
| 5,440,468 | 8/1995 | Savage, Jr. . |
| 5,448,675 | 9/1995 | Leone et al. . |
| 5,452,124 | 9/1995 | Baker . |
| 5,712,942 | 1/1998 | Jennings et al. . |
| 5,774,245 | 6/1998 | Baker . |
| 5,965,877 | * 12/1999 | Wood et al. ..................... 250/227.15 |
| 6,002,331 | 12/1999 | Laor . |
| 6,074,247 | * 6/2000 | Hall et al. ........................... 439/532 |

FOREIGN PATENT DOCUMENTS

| | | |
|---|---|---|
| 295 09 381 U1 | 10/1995 | (DE) . |
| 0 443 454 A2 | 8/1991 | (EP) . |
| 0 514 638 A1 | 11/1992 | (EP) . |
| 08146238 | 6/1996 | (JP) . |
| WO 97/41720 | 11/1997 | (WO) . |

OTHER PUBLICATIONS

Brochure from ADC Telecommunications entitled "ADC's RF Worx™ RF Distribution and Management Products," 11 pages, dated Dec. 1996.

Brochure from ADC Telecommunications entitled "Frameworx Value–Added Connector Module System," 32 pages, dated Jul. 1994.

Brochure from ADC Telecommunications entitled "Fiber Optic Couplers, Splitters and Wavelength Division Multiplexers," 27 pages, dated Jul. 1997.

\* cited by examiner

*Primary Examiner*—Jon Henry
(74) *Attorney, Agent, or Firm*—Merchant & Gould P.C.

(57) ABSTRACT

A fiber optic module includes front adapters for connection to fiber optic connectors, and rear adapters for connection to fiber optic connectors. The module includes two circuits having passive optical couplers inside, and adapters exposed along the front and the rear of the module. The module is usable in cross-connect applications with itself or with other modules. The adapters are selectively connectable to fiber optic connectors. The front adapters of the module include two receive input ports and two transmit output ports. The front of the module also includes two visual indicators, one for each circuit. The visual indicators include a lens cap at least partially transparent to visual light in light communication with an optical fiber. The rear adapters of the module include two transmit input ports and two transmit output ports. Monitor ports are also located on the rear for both the transmit and receive signals. The receive monitor ports also function as the input ports for an identification signal sent in the reverse direction for illuminating the visual indicators along the front of the module or another module. Alternatively, separate identification signal input ports can be provided on the front as adapters.

2 Claims, 15 Drawing Sheets

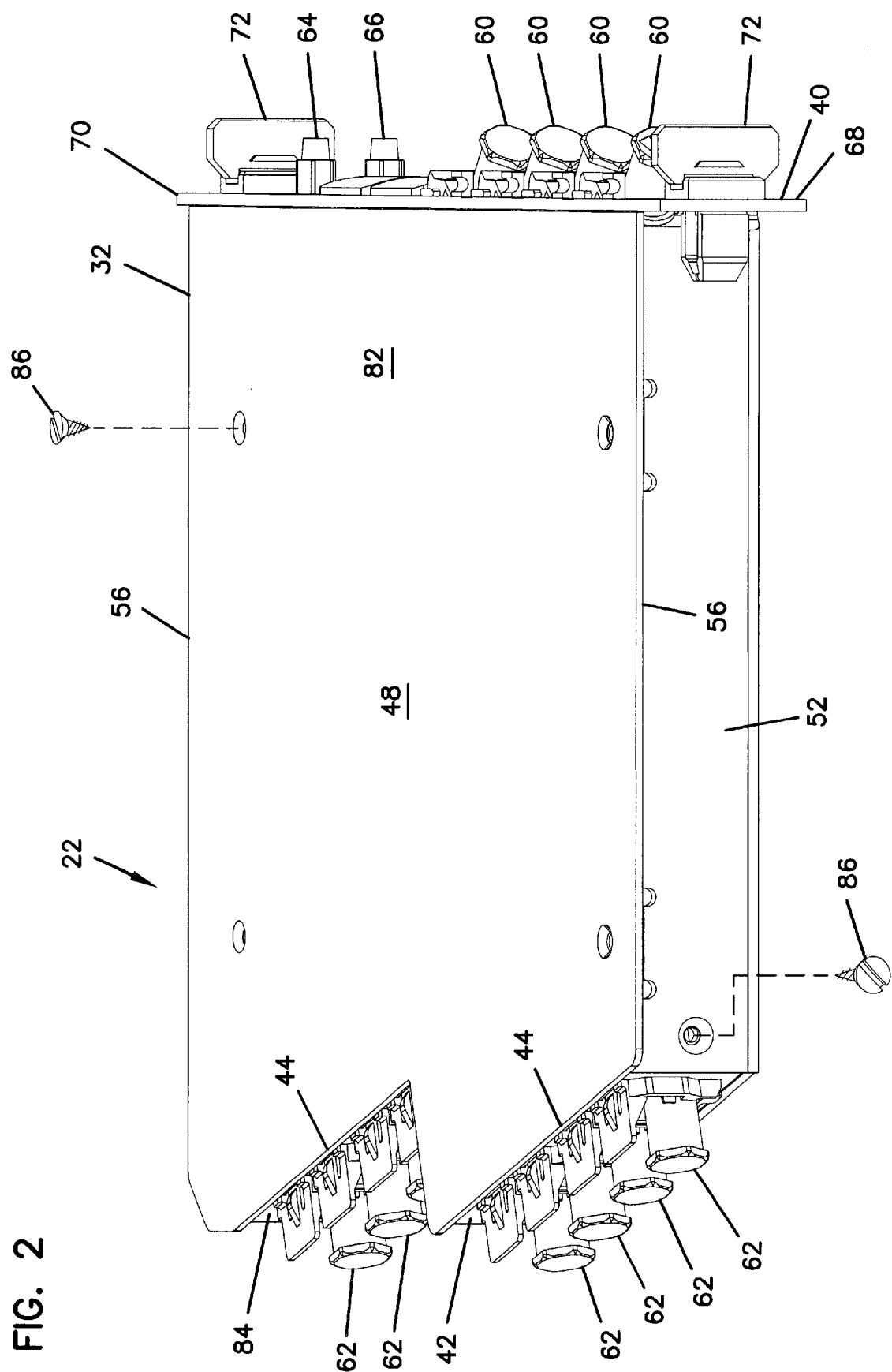

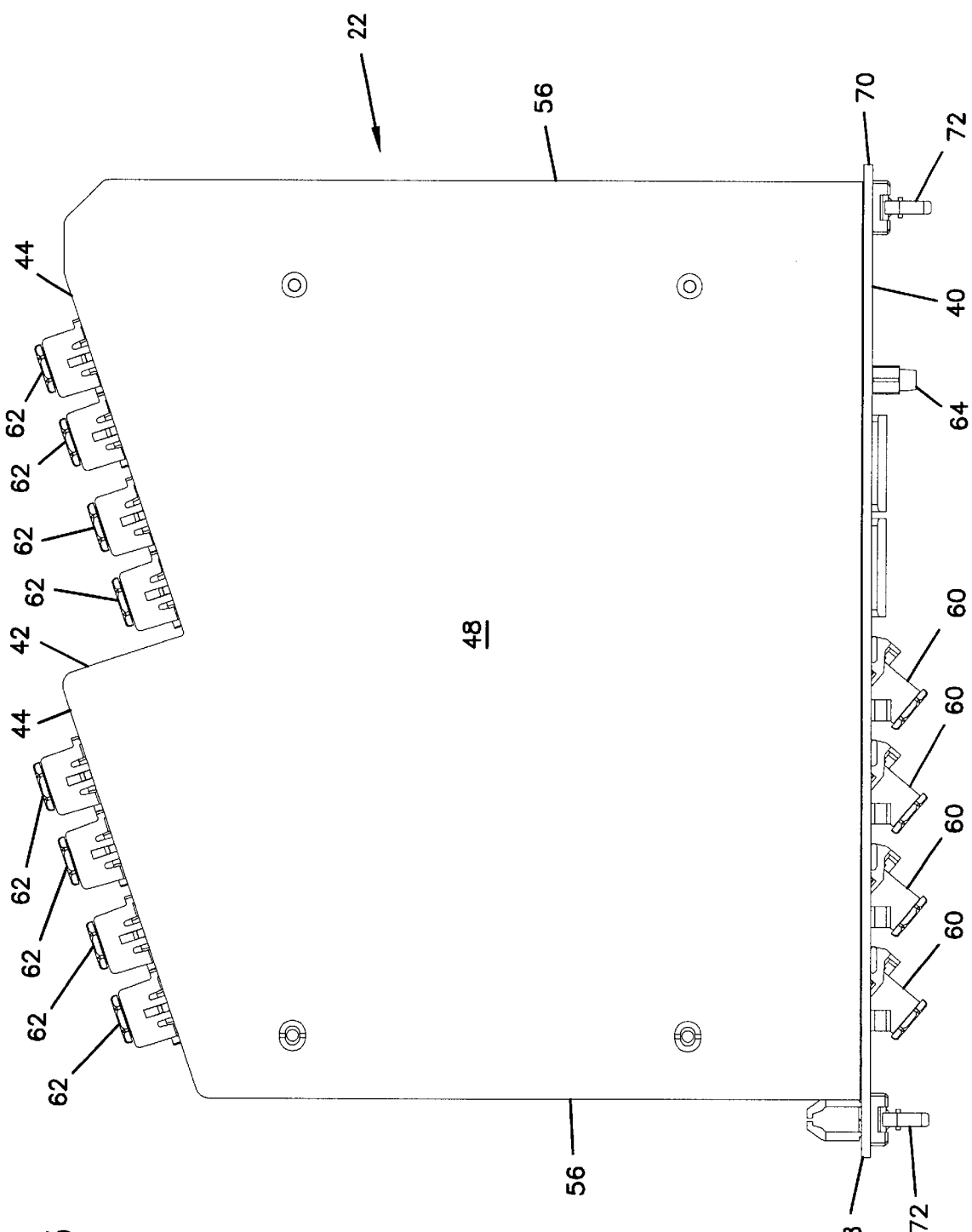

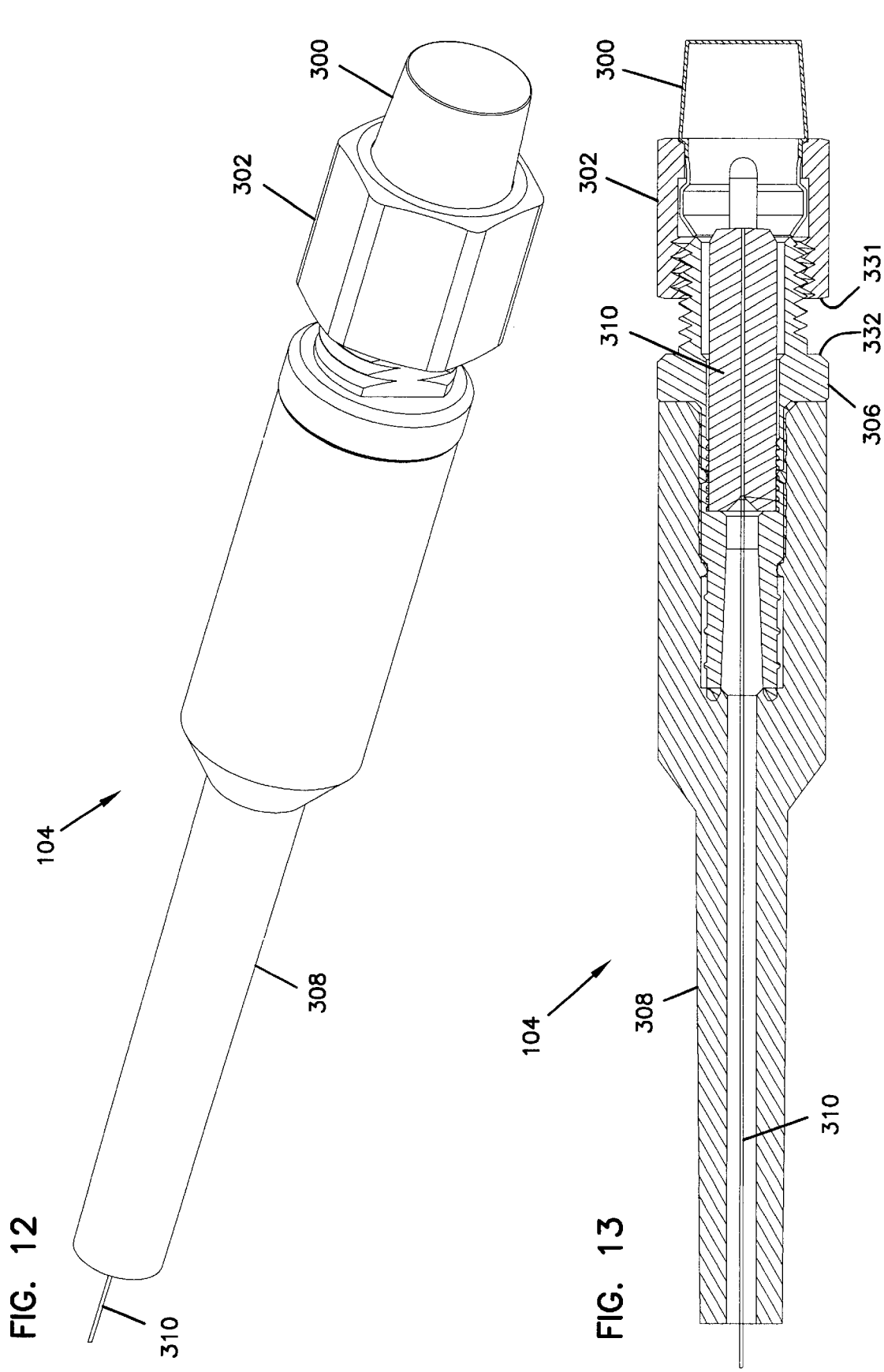

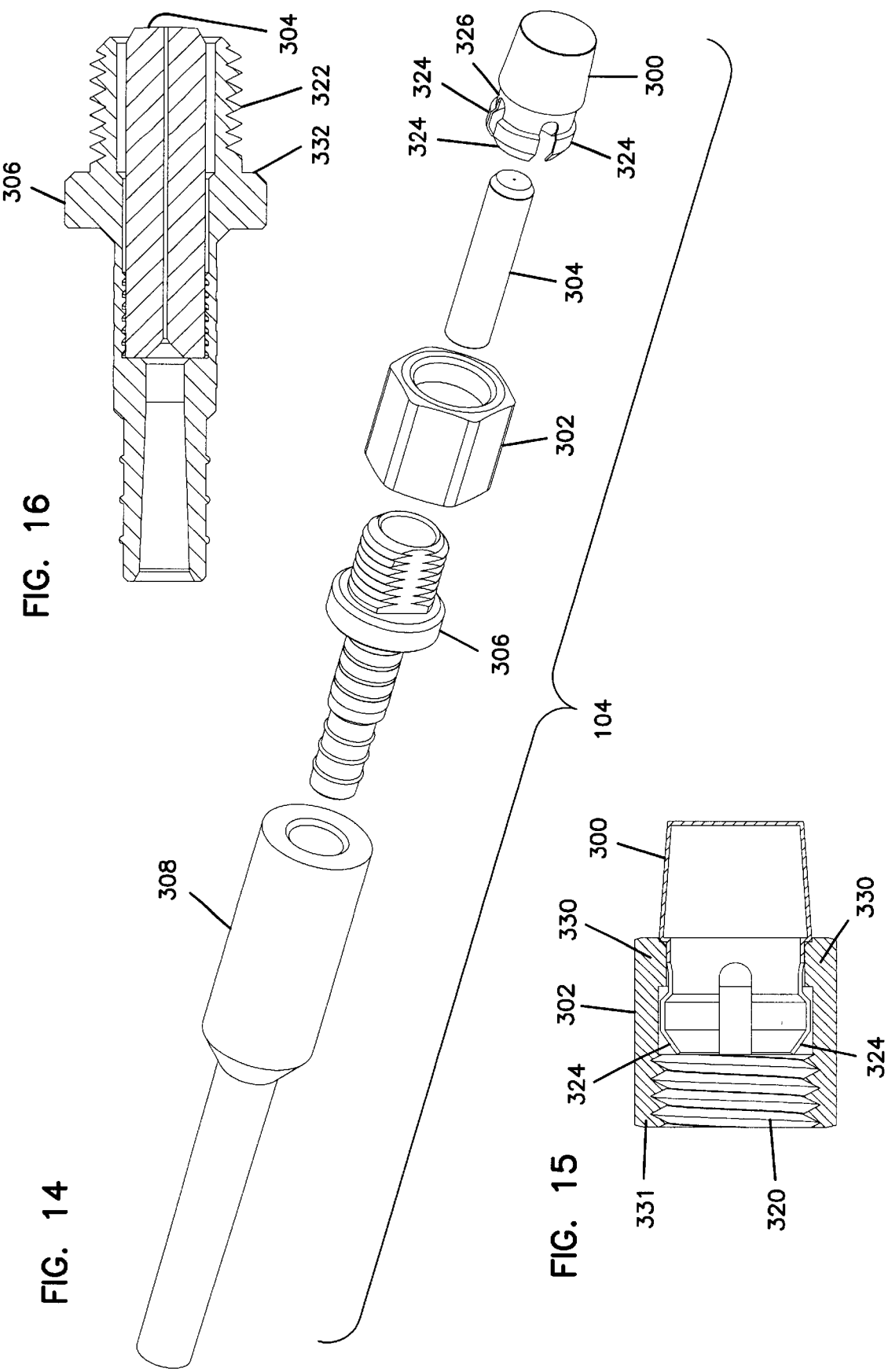

FIBER OPTIC MODULE INCLUDING LENS CAP

This application is a divisional of application Ser. No. 09/121,066, filed Jul. 21, 1998, now U.S. Pat. No. 6,208,796 which application(s) are incorporated herein by reference.

FIELD OF THE INVENTION

The present invention relates to fiber optic modules for use in cross-connecting fiber optic equipment.

BACKGROUND OF THE INVENTION

The telecommunications and data transmission industries are rapidly expanding their development of fiber optic transmission systems. Historically, telecommunications signals and data have been transmitted over wire lines such as twisted pair or coaxial cables. In order to accommodate higher signal rate speeds, the industry is turning to increased use of fiber optic cables as the transmission medium.

As the use of fiber optic cables increases, the need for peripheral equipment has increased. For example, it is desirable to have access to a fiber optic line for the purpose of either re-routing the line in the event of damage to the line or to have access to the line for purposes of monitoring or testing the line.

Fiber optic peripheral equipment for cable management, cable storage and connection capabilities are well known. The use of modular fiber optic connector modules is known for performing so-called cross-connect applications. U.S. Pat. Nos. 5,432,875 and 5,363,465 to ADC Telecommunications, Inc. concern fiber optic connector modules and chassis designs for receiving the modules in cross-connect applications.

PCT WO97/41720 also concerns a fiber optic module for use in cross-connect applications. The document discloses optical signal routing, monitoring, and visual path identification capabilities.

There is a continuing need for fiber optic modules which provide optical signal routing, monitoring, and visual path identification capabilities.

SUMMARY OF THE INVENTION

A fiber optic module for mounting to a chassis for holding one or more modules has front and rear access defined by a plurality of connection locations. The connection locations are linked by optical couplers. Two circuits are disposed within the housing of the module. The module is used to cross-connect fiber optic equipment via patch cords on the front connection locations.

In one preferred embodiment, the front of the module includes four adapters for connection to fiber optic connectors, and two visual indicators for visual path identification for the circuits. The front may also include visual signal identification input ports. The rear includes eight adapters for connection to fiber optic connectors.

The rear of the module may include angled linear segments for the connection locations. The front may include adapters in a linear array, each held at an angle to the front of the module by an angled retainer.

The visual indicators may include a lens cap at least partially transparent to visual light connectable to an optical fiber. During injection of an optical signal through the fiber in the visible light range, the lens cap will illuminate.

BRIEF DESCRIPTION OF THE DRAWINGS

In the drawings, wherein like reference letters and numerals indicate corresponding elements throughout the several views:

FIG. 2 shows a perspective side view of one of the four port fiber optic modules;

FIG. 3 is a top view of the module of FIG. 2;

FIG. 12 is a perspective view of the visual indicator for the signal identifier output device along the front of the module;

FIG. 13 is a cross-sectional side view of the signal identifier output device;

FIG. 14 is a cross-sectional view of the lens cap and the nut of the signal identifier output device;

FIG. 15 is a cross-sectional side view of the sleeve and the ferrule of the signal identifier output device;

FIG. 16 is an exploded view of the signal identifier output device;

DETAILED DESCRIPTION OF THE PREFERRED EMBODIMENTS

Figure 1:
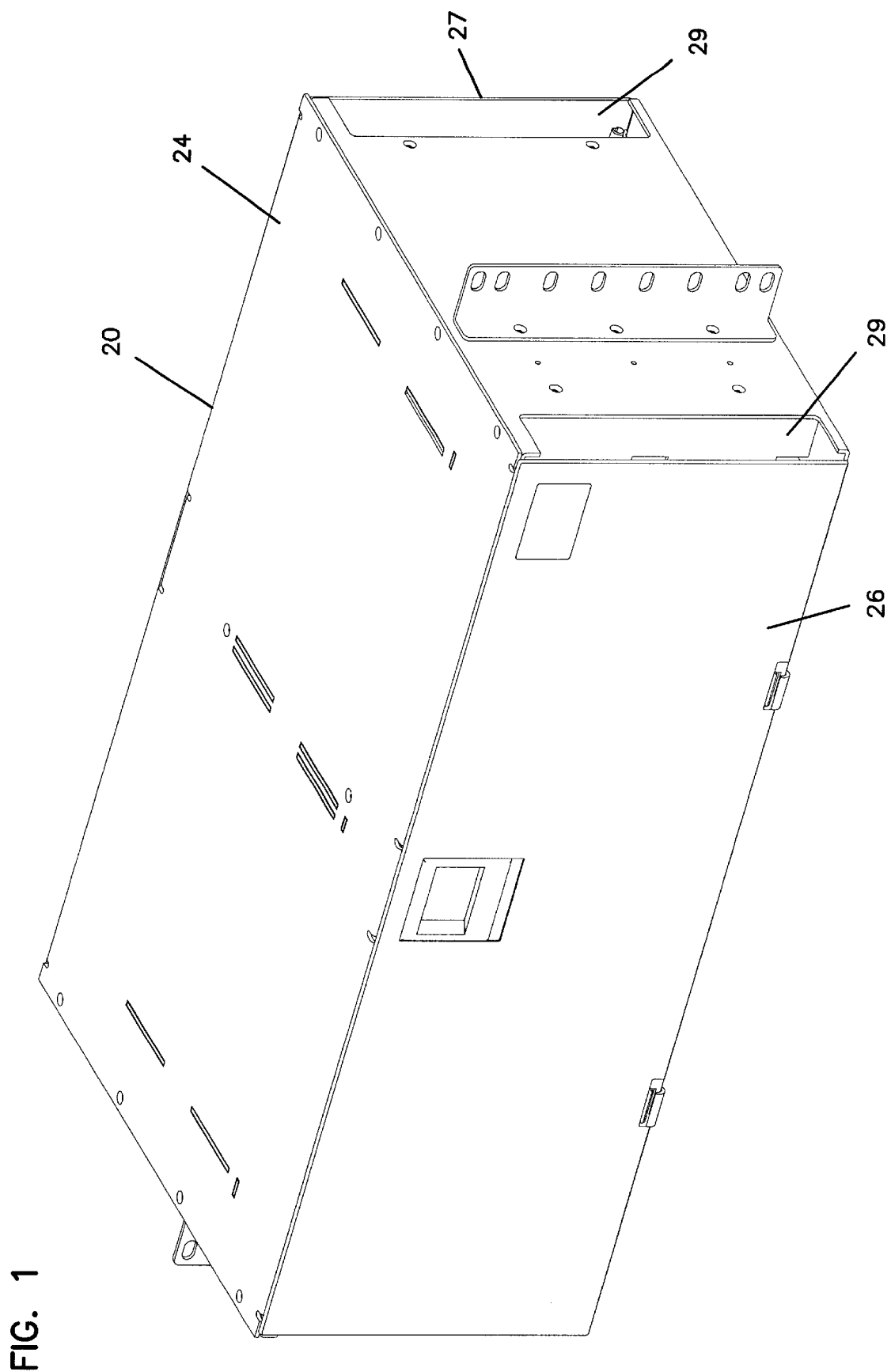
FIG. 1 shows a perspective view of a chassis including several fiber optic modules mounted within the chassis.
Figure 1A:
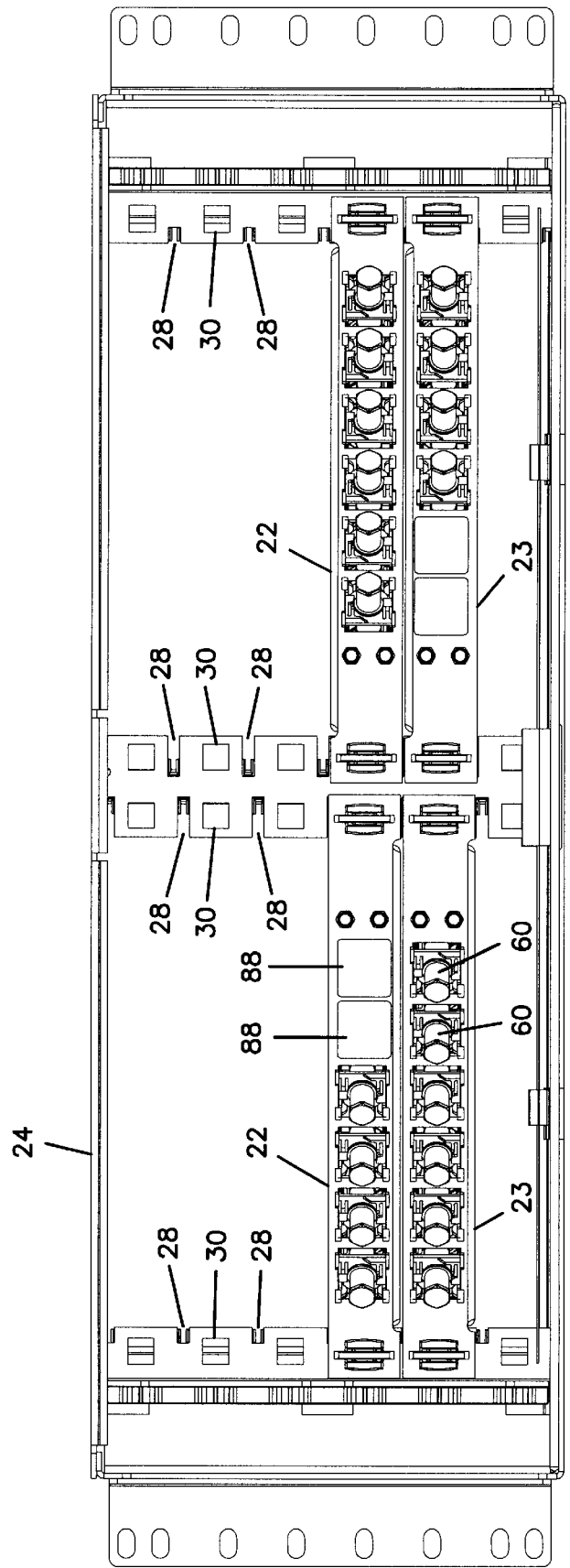
FIG. 1A is a front view of the chassis with the front door open, and showing two four port fiber optic modules, and two six port fiber optic modules mounted to the chassis.
Figure 1B:
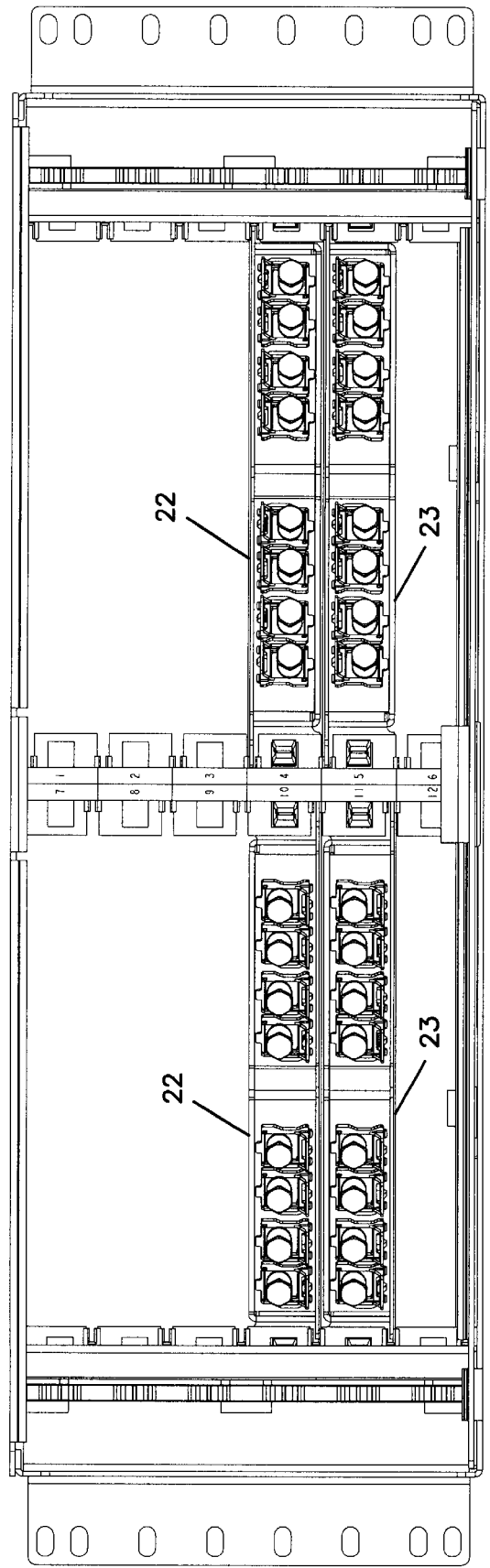
FIG. 1B is a rear view of the chassis and modules shown in FIG. 1A with the rear door open.

Referring now to FIGS. 1, 1A and 1B, a fiber optic chassis 20 is shown for holding a plurality of the fiber optic modules 22, 23. Chassis 20 is mountable to a rack (not shown) for holding chassis 20. Chassis 20 includes an outer housing 24, and a pivotable front door 26. Front door 26 allows access to an interior of chassis 20, so as to access individual modules 22, 23 such as for repair or replacement of modules 22, 23 or to connect or disconnect the modules with other modules or fiber optic equipment. Rear door 27 also pivots in a similar manner to allow access to the rear areas of modules 22, 23. Housing 24 includes a plurality of guides 28 for holding the individual modules 22, 23 in a horizontal manner. Side openings 29 allow for cable pathways into and out of chassis 20.

Modules 22 have four connection locations or ports along the front, and modules 23 have six connection locations or ports along the front. As will be described in greater detail below, modules 22, 23 are similar in many respects. Both modules 22, 23 preferably include two circuits for use in cross-connecting fiber optic equipment connected to the modules at rear connection locations or ports. The modules 22, 23 may also be used for interconnecting fiber optic equipment as desired.

Both modules 22, 23 also allow signal monitoring and visual continuity checks for the circuits. One difference is that to inject an identification signal into one of the circuits, the input port is on the rear for module 22 and on the front for module 23.

Referring now to FIGS. 2–5, module 22 has a module housing 32 including a front face 40, and a generally opposite facing rear face 42. The front and rear faces 40, 42 each define connection locations 60, 62 for connecting module 22 to fiber optic cables. In the embodiment shown, front face 40 is generally planar, and rear face 42 generally includes at least one angled, linear segment, and preferably two angled, linear segments 44. The angled segments allow for more connection locations 62 than would be possible with a planar rear face 42 parallel to front face 40. In the embodiment shown, eight connection locations are defined on rear face 42, four per segment 44. In the embodiment shown, the connection locations 60, 62 are both angled relative to front face 40.

Module 22 further includes opposed major planar sides 48, 50. Major sides 48, 50 define a top and a bottom in the illustrated embodiment for module 22. Module 22 further includes opposed minor planar sides 52, 54 defining sides of module 22 in the embodiment shown. Major side 48 has side extensions 56 which form slide rails 56 for receipt in guides 28 of chassis housing 24. Module 22 is mounted in either orientation as shown in FIGS. 1, 1A, and 1B. When modules 22 are flipped between the left and right sides, angled connection locations on the front and the rear are directed to respective left and right sides of chassis 20 as shown. Also, module 22 can be mounted vertically if desired.

Figure 17:
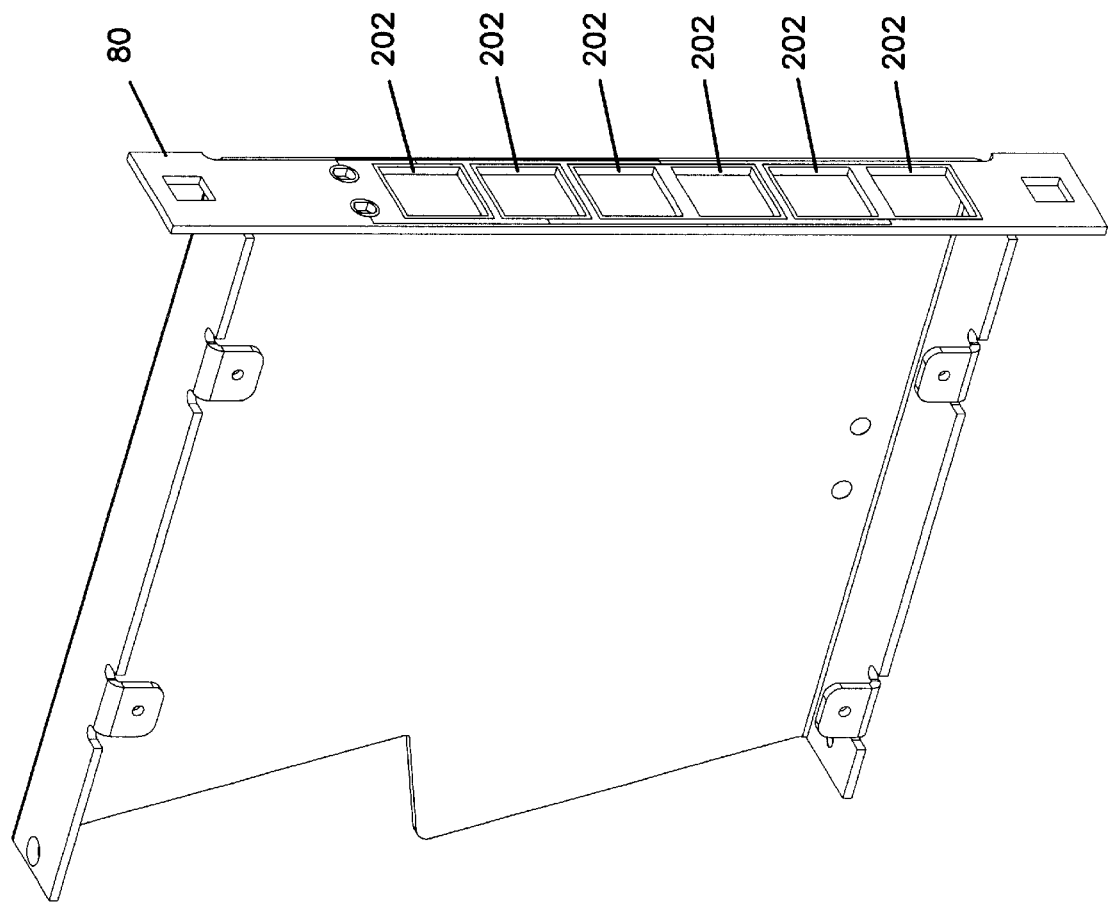
FIG. 17 is a perspective view of a portion of the module housing.

One construction of module housing 32 is to form front face 40, major side 50, and minor sides 52, 54 from a single main piece 80 (see FIG. 17), such as from sheet metal. A separate cover 82 (see FIG. 2) and a separate saw tooth-shaped rear piece 84 (see FIGS. 2 and 18), such as from sheet metal, both attach to single main piece 80 to form the housing for the optical couplers and adapters which permits connection to optical equipment. The attachment of parts can be by fasteners, such as screws.

Module 22 includes a plurality of first adapters 60 exposed along front face 40 for the front connection locations for connection to fiber optic connectors. A plurality of second adapters 62 are positioned along rear face 42 for the rear connection locations, also for connection to fiber optic connectors. The first and second adapters 60, 62 are preferably positioned in linear arrays parallel to front face 40. The adapters shown are FC type, but could also be SC, ST, or any other suitable connection scheme. The plurality of first adapters 60 are used to cross-connect fiber optic equipment connected to the plurality of rear adapters 62 of module 22. Alternatively, the equipment may be connected to the rear adapters 62 module 22 and to another module. The two modules are cross-connected to connect the equipment in this situation. Front face 40 of module 22 also includes two visual indicators 64, 66 connected to the optical components within module 22, as will be described in greater detail below. Alternatively, module 22 can be interconnected to other equipment or another module via front adapters 60.

Module 22 further includes end flanges 68, 70 for use in mounting module 22 to chassis 20. Locking members 72 releasably hold flanges 68, 70 to holes 30 of housing 24 of chassis 20. Locking members 72 are of the type shown and described in U.S. Pat. No. 5,363,465. Locking members 72 operate to lock or release by rotating 90 degrees. Other locking members, including screws may be used as desired.

Front adapters 60 define receive and transmit ports for two passive optical circuits contained within module 22. In a cross-connect application, rear adapters 62 are connected to fiber optic equipment to be cross-connected at the front adapters 60 through patch cords. The two circuits each allow optical signal routing, monitoring and signal path identification.

Module 22 of one preferred embodiment fits into existing chassis 20 having individual module opening widths of about 7.237 inches, and heights of about 1.100 inches. Holes 30 are positioned about 7.905 inches apart. Module 22 of one preferred embodiment has a length between sides 52, 54 of about 7.11 inches, a length between the outside edges of side extensions 56 of about 7.96 inches, a length between sides 48, 50 of about 1.06 inches, and a length of front face 40 including flanges 68, 70 of about 8.61 inches. Module 22 with two independent circuits has double the density over a module 22 having only a single circuit.

Module 22 includes two plugs 88 which fill unused holes in front face 40 in module 22. In module 23, adapters 60 are positioned in front face 40 (see FIG. 1A) where the plugs are in module 22 in a similar manner as the other adapters 60, for connection to a fiber optic connector.

Figure 6:
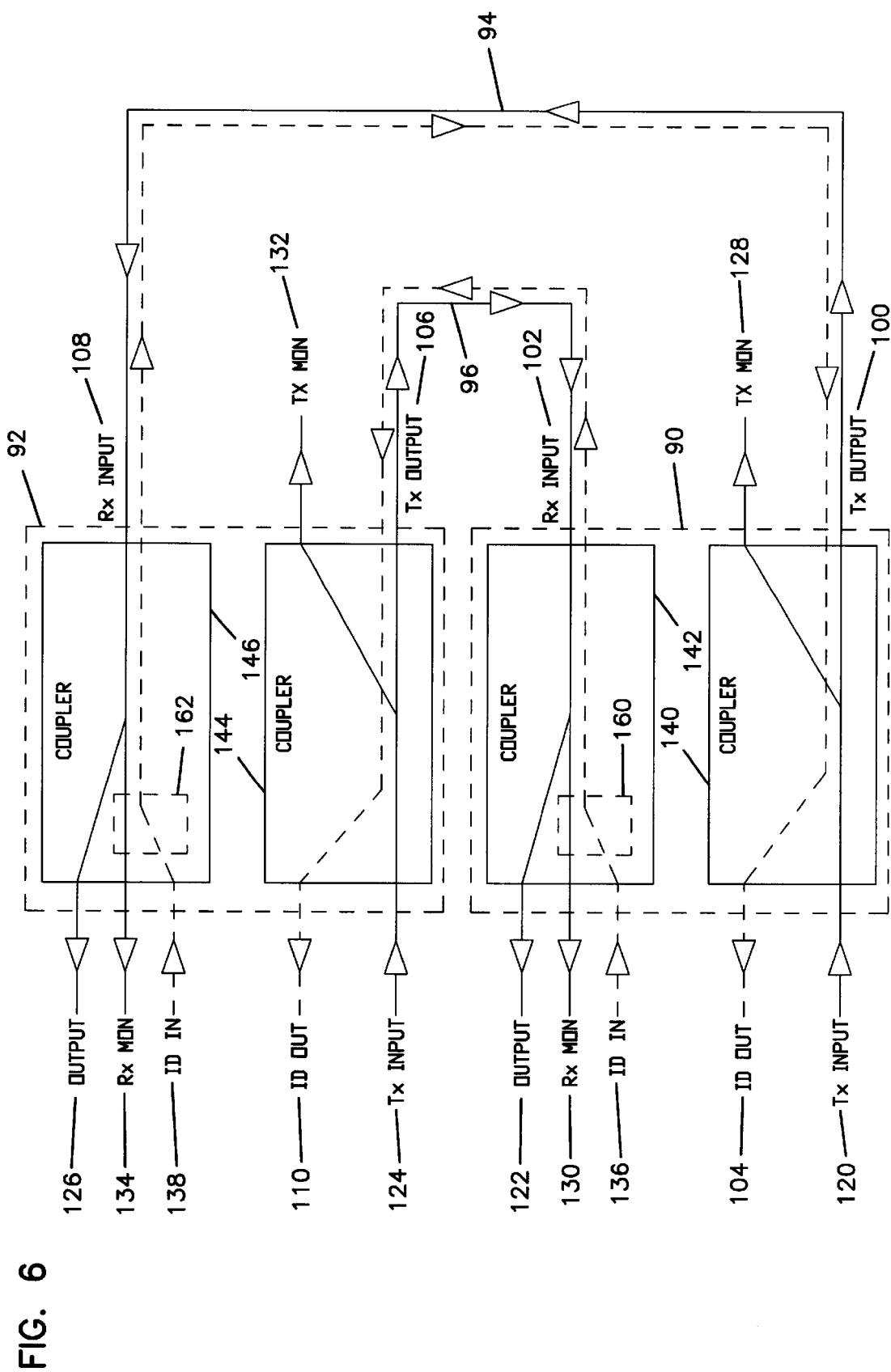
FIG. 6 is a schematic circuit path drawing showing the exemplary signal paths for the main signals (solid) and for the visible continuity check and identifier signals (dashed)
Figure 7:
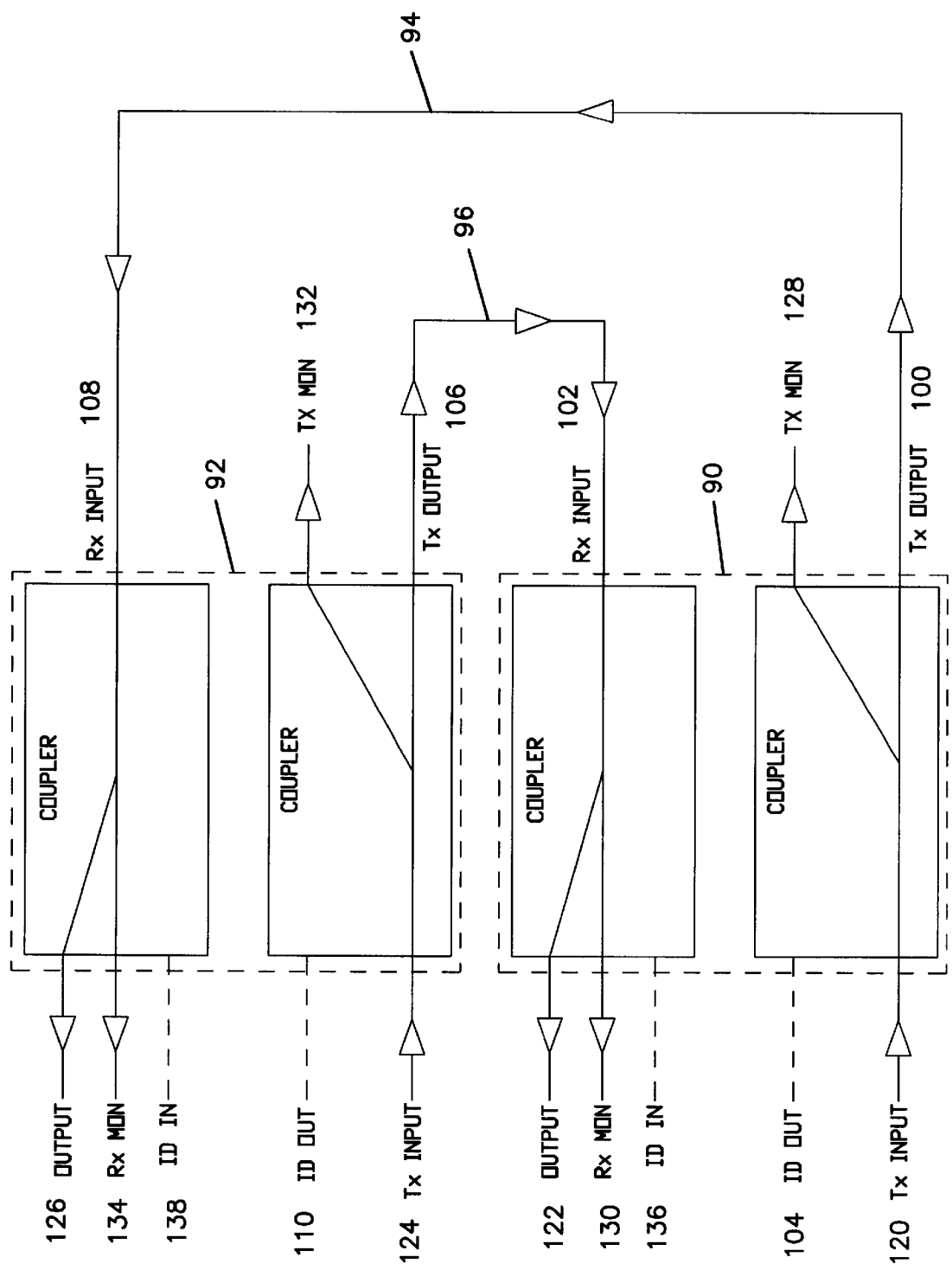
FIG. 7 shows only the circuit paths for the main signals of the circuit drawing of FIG. 6.
Figure 8:
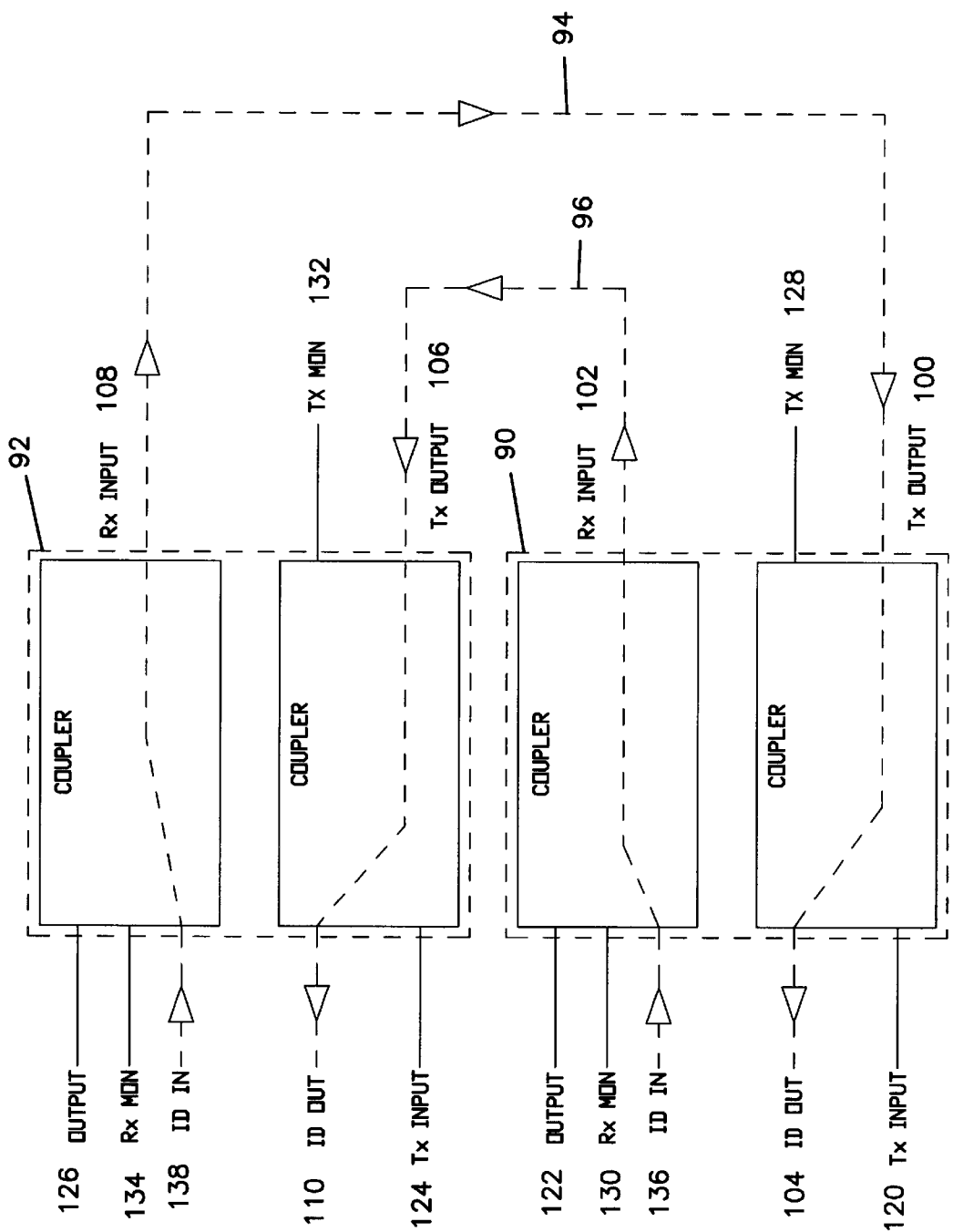
FIG. 8 shows only the circuit paths for the visible continuity check and identifier signals of the drawing of FIG. 6.

FIGS. 6–8 illustrate the circuit paths through modules 22, 23 during main signal usage (FIGS. 6 and 7), and visual continuity check and identifier usage (FIGS. 6 and 8). Main signals are at the 1310 nanometer (nm) window (for example, 1260–1360 nm) or the 1550 nm window (for example, 1430–1580 nm). During visual continuity checking and identification, the identification signals are passed through the circuits in a reverse direction to the main signals. Further, the identification signals are at a wavelength of visible light, such as 400–700 nm.

Figure 4:
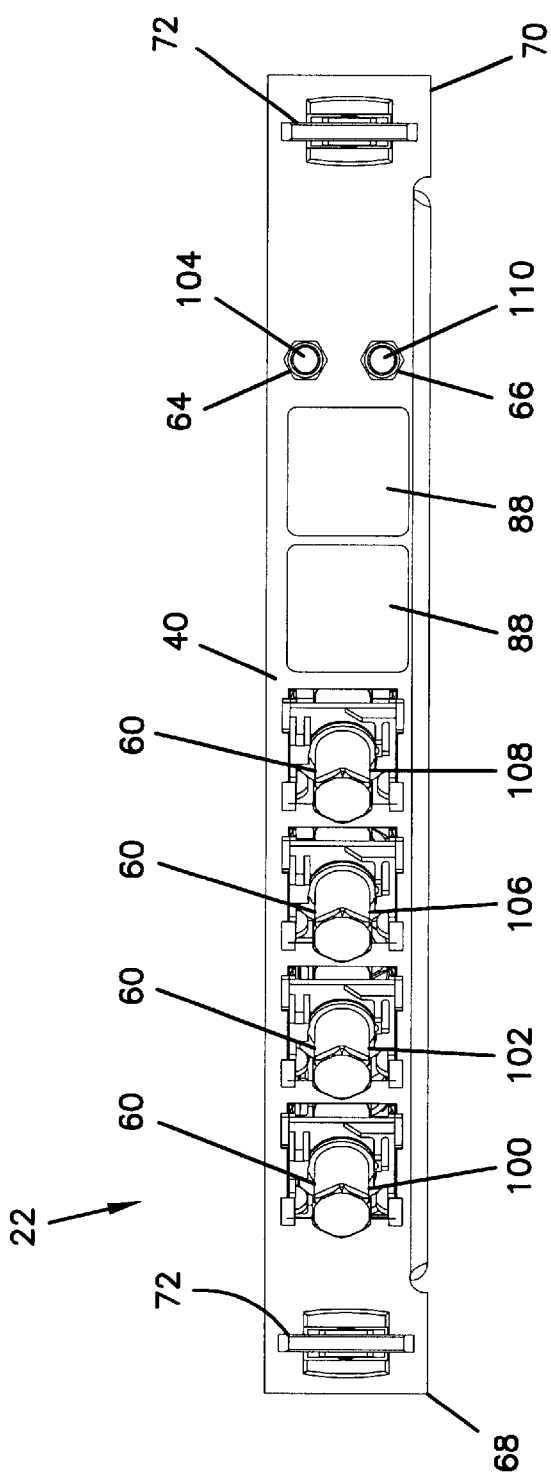
FIG. 4 is a front view of the module of FIG. 2.
Figure 5:
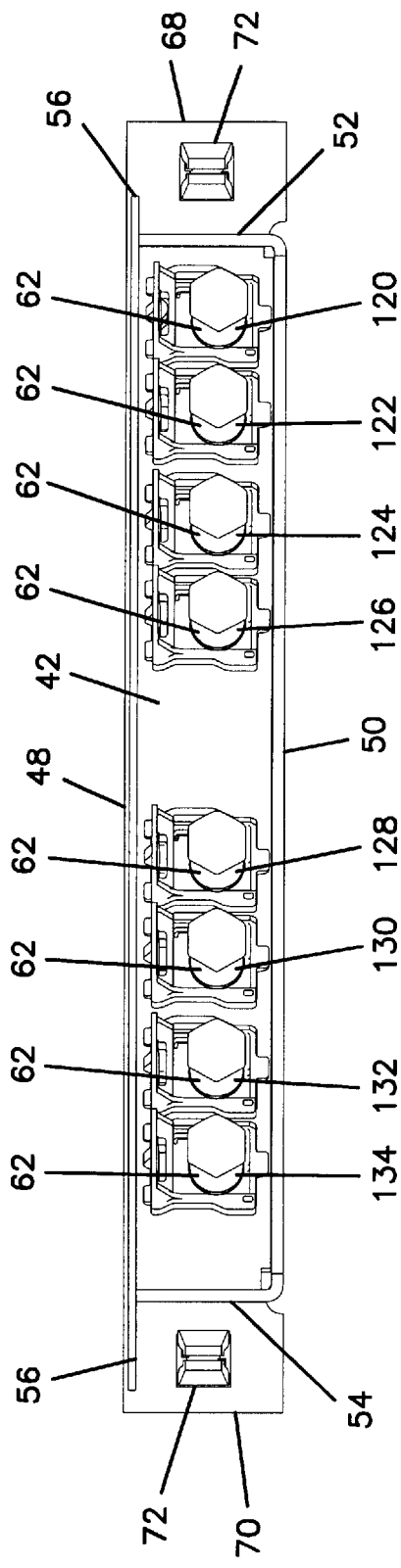
FIG. 5 is a rear view of the module of FIG. 2.

Referring now to FIGS. 4 and 6, along the front of module 22, two adapters 60 define a first transmit output port 100 and a first receive input port 102 as part of a first circuit 90. Adapters 60 further define a second transmit output port 106, and a receive input port 108 as part of a second circuit 92. A first LED 104 defines first visual indicator 64 and is linked to first circuit 90 for circuit continuity checking and identification. A second LED 110 defines second visual indicator 66 and is linked to second circuit 92 for circuit continuity checking and identification. FIGS. 6–8 are schematics which show the circuit paths during use of module 22 where first circuit 90 is cross-connected to second circuit 92 with patch cords 94, 96. Each of first and second circuits 90, 92 are also cross-connectable to circuits of other modules. Each of circuits 90, 92 are interconnectable to other modules or equipment.

Adapters 62 define various ports for first and second circuits 90, 92. Specifically, a first transmit input port 120 and a first receive output port 122 are linked to first circuit front ports 100, 102 through optical couplers within module 22. Also, a second transmit input port 124 and a second receive output port 126 are linked to second circuit front ports 106, 108 through optical couplers. A first transmit monitor port 128 and a first receive monitor port 130 are part of first circuit 90, and are positioned along rear face 42. A second transmit monitor port 132 and a second receive monitor port 134 are part of second circuit 92, and are also positioned along rear face 42.

Receive monitor port 130 also is utilized as an identification input port for injecting a signal into first circuit 90 to trace a circuit path through module 22 to another circuit in module 22 or to another module altogether.

In FIG. 6, receive monitor port 130 is shown separate from identification input port 136. This is the case for six port module 23. For four port module 22, the two ports 130, 136 are combined and share the same connector location. This requires an operator to selectively use the combined port as either a monitor or a visual indicator for continuity checking.

Receive monitor port 134 is also utilized as an identification input port for injecting a signal into second circuit 92 to trace a circuit path through module 22 to another circuit in module 22 or to another module altogether.

In FIG. 6, receive monitor port 134 is shown separate from identification input port 138. As above for ports 130, 136, ports 134, 138 are separate ports for module 23. For module 22, they are the same connection location.

A first optical coupler 140, such as a two-by-two splitter, links transmit input port 120 to transmit output port 100 and transmit monitor port 128, each receiving a portion of the signal, such as 50%. A second optical coupler 142, such as a one-by-two splitter links receive input port 108 to receive output port 126 and receive monitor port 134, each receiving a portion of the signal, such as 50%. Third and fourth optical couplers 144 and 146 are similarly configured for splitting of the signals from an input port between the respective output and monitor ports. Each of couplers 140, 142, 144, 146 allow the identification signal to pass in the reverse direction to the main signal.

If separate ports are desired for the receive signal monitor function and the identification signal input function, a further optical coupler is provided. In first circuit 90, a secondary coupler 160, such as a 1×2 splitter, is provided where monitor port 130 receives about 95% of the signal, and the remaining about 5% is received by the input port 136. A similar construction is provided for secondary coupler 162 of second circuit 92. Each of couplers 160, 162 allow the identification signal to pass in the reverse direction to the main signal.

Figure 9:
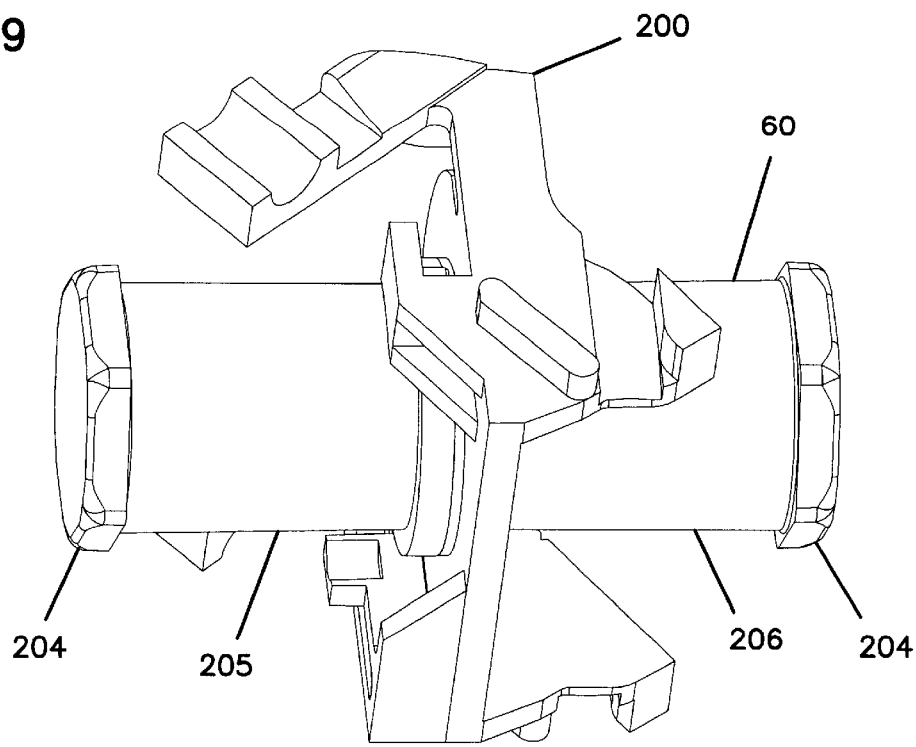
FIG. 9 shows an adapter and retainer of the type along the front of the module.

Referring now to FIG. 9, adapter 60 is shown in greater detail with a retainer 200 for holding adapter 60 in an opening 202 (see FIG. 18) of module housing 32. Retainer 200 holds adapter 60 at a non-perpendicular angle relative to the axis of opening 202. Retainer 200 snaps into opening 202. Retainer 200 is also removable, as desired. U.S. Pat. No. 5,214,735 to ADC Telecommunications, Inc. shows and describes an example retainer 200. Other retainers are possible for mounting adapters 60 to module 22. Once mounted, end 205 of adapter 60 is exposed for connection to a connector of a fiber optic patch cord, shown schematically in FIGS. 6–8 as cords 94, 96.

Figure 10:
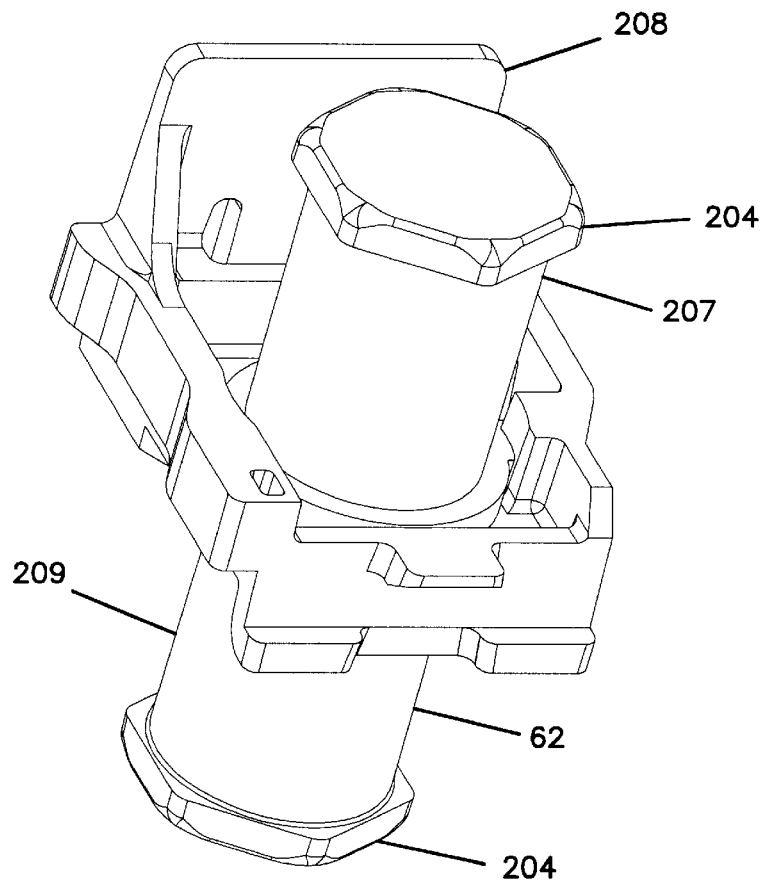
FIG. 10 shows an adapter and retainer of the type along the rear of the module.
Figure 11:
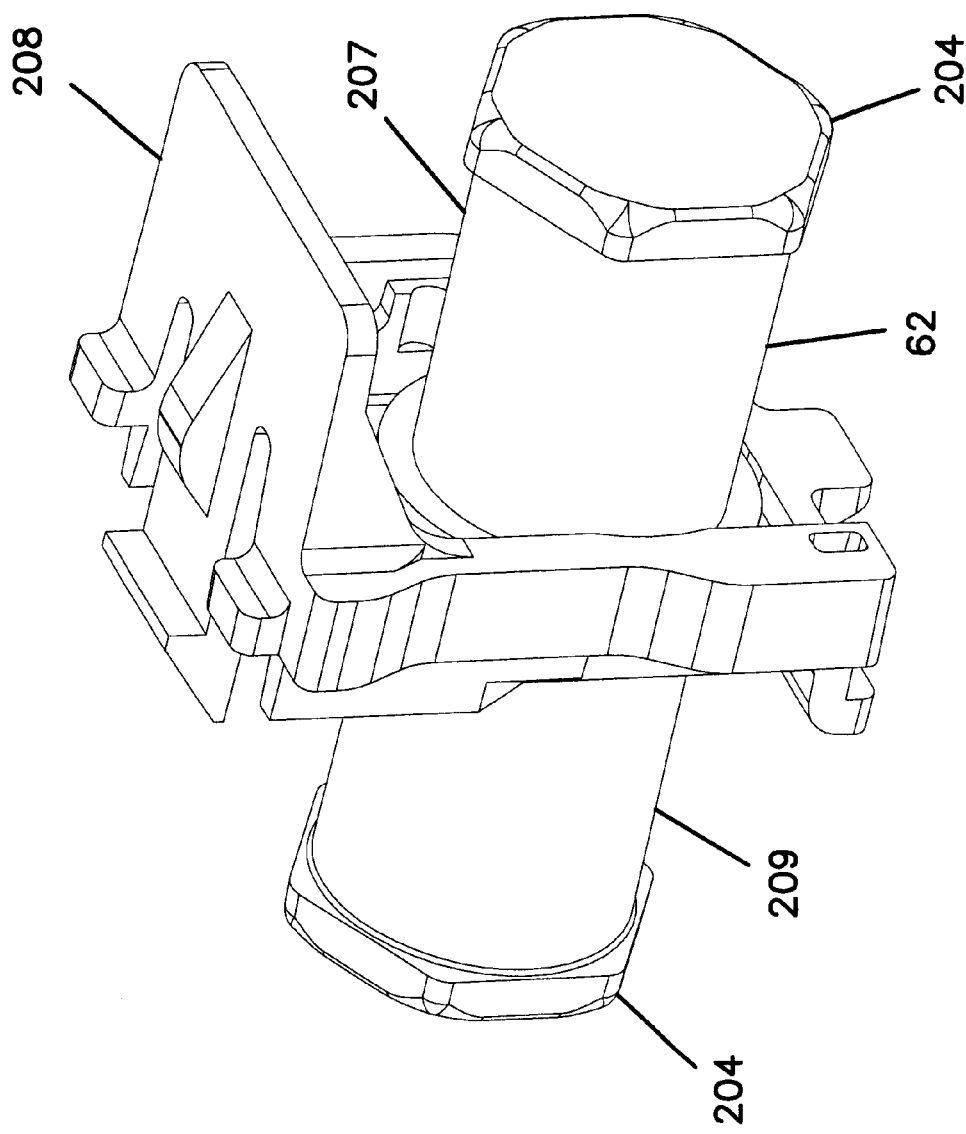
FIG. 11 shows a further view of the adapter and retainer of FIG. 10.
Figure 18:
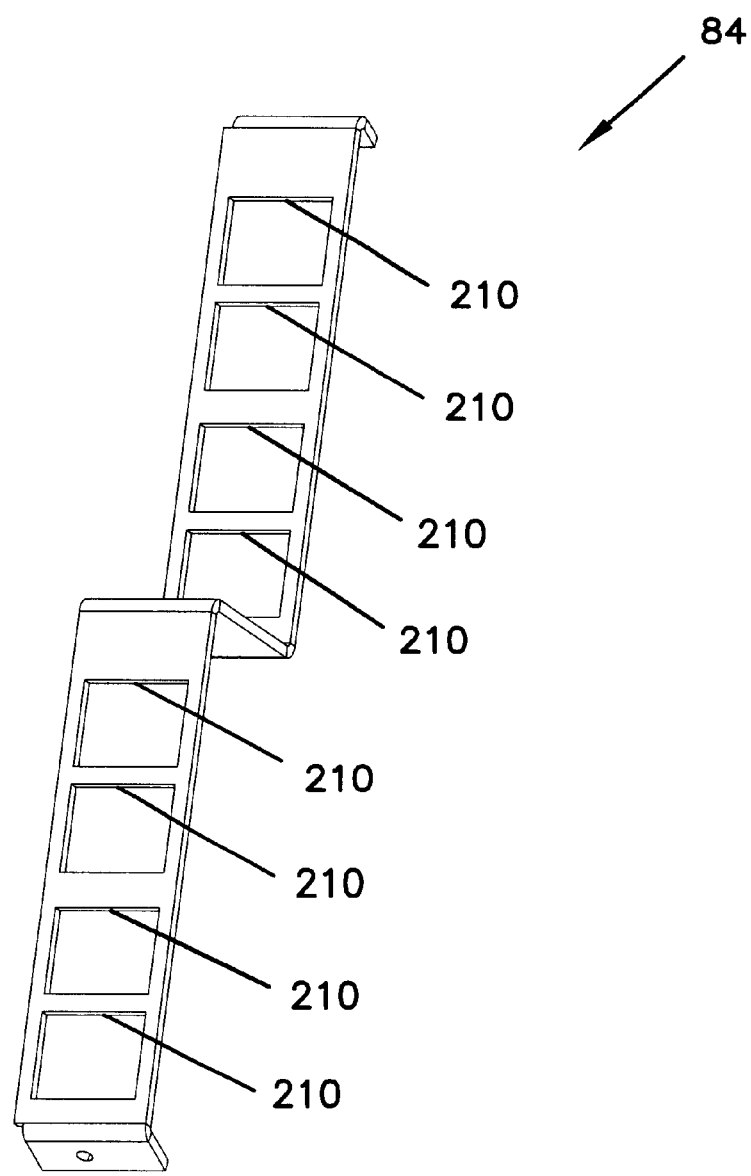
FIG. 18 is a perspective view of a further portion of the module housing.

Referring now to FIGS. 10 and 11, adapter 62 is shown in greater detail with a retainer 208 for holding adapter 62 in one of the openings 210 along rear face 42 of module housing 32 (see FIG. 18). Retainer 208 snaps into opening 200, and is removable as desired. Adapter 62 is shown with protective caps 204. Other retainers are possible for mounting adapters 62 to module 22. Once mounted, end 207 is exposed for connection to a connector of a fiber optic cable. As illustrated, adapters 60, 62 include protective end caps 204, which are removed prior to connection to a connector. Adapters 60, 62 also allow connection at opposite ends 206, 209 to FC type connectors so as to connect easily to the optical couplers within module 22. Other connector types can be used, as desired.

Referring now to FIGS. 13–16, first LED 104 is shown in greater detail. Second LED 110 is constructed in a similar manner. Each LED includes a lens portion optically linked to a fiber connected to the main circuits to provide a continuity check for each circuit. A lens cap 300 is held by a nut 302 to an outer sleeve 306. Lens cap 300 is made from a material at least partially transparent to visible light. An integrally molded lens cap 300 and nut 302 is also possible. An inner ferrule 304 held to outer sleeve 306, such as adhesive, holds an optical fiber 310 such that an end of the fiber is adjacent to cap 300. An outer boot 308 provides strain relief for outer sleeve 306. Nut 302 includes threads 320 which threadably mount to threads 322 of outer sleeve 306. Cap 300 includes a plurality of flexible legs 324 which enable positioning of a recessed region 326 disposed on an outer surface of cap 300 around a shoulder 330 of nut 302. Such a construction allows retention of cap 300 with nut 302. By threading nut 302 to outer sleeve 306, front face 40 of module housing 32 is trapped between end 331 of nut 302 and shoulder 332 of outer sleeve 306. When visible light is passed through fiber 310, the light illuminates lens cap 300 providing a visual indicator to the operator. In an alternative embodiment, lens cap 300 and the remaining components necessary to attach it to a fiber, can be molded from plastic, such as a one-piece molded part.

Having described the present invention in a preferred embodiment, modifications and equivalents may occur to one skilled in the art. It is intended that such modifications and equivalents shall be included within the scope of the claims which are appended hereto.

What is claimed is:

1. A fiber optic continuity indicator device for a fiber optic module including a housing, the device comprising:
   a lens cap at least partially transparent to visible light;
   a nut mounted to the lens cap;
   a sleeve threadably mountable to the nut;
   a ferrule for holding an optical fiber, the ferrule mounted to the sleeve;
   the nut and the sleeve threadably mountable together to define a space for receipt of a portion of the housing of the fiber optic module.

2. A fiber optic module mountable to a chassis comprising:
   a module housing having front and rear faces, opposed major sides, and opposed minor sides defining an enclosed interior, the front face including mounting flanges for mounting the module to the chassis;
   a plurality of exposed first adapters along the front face, each of the plurality of first adapters connectable to a fiber optic connector external to the module;
   a plurality of exposed second adapters along the rear face, each of the plurality of second adapters connectable to a fiber optic connector external to the module;
   wherein the plurality of first and second adapters are optically connected to a fiber optic component disposed in the enclosed interior;
   wherein the front face includes a visual indicator optically connected to the fiber optic component, the visual indicator including a lens cap at least partially transparent to visual light.

\* \* \* \* \*